US012625767B2

(12) United States Patent
Eliash et al.

(10) Patent No.: US 12,625,767 B2
(45) Date of Patent: May 12, 2026

(54) STORING STATUS INFORMATION USING REDUNDANT COLUMNS

(71) Applicant: Micron Technology, Inc., Boise, ID (US)

(72) Inventors: Tomer Eliash, Sunnyvale, CA (US); Devin Batutis, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 107 days.

(21) Appl. No.: 18/789,454

(22) Filed: Jul. 30, 2024

(65) Prior Publication Data

US 2026/0037374 A1 Feb. 5, 2026

(51) Int. Cl.
 *G06F 11/10* (2006.01)
 *G06F 11/07* (2006.01)
 *G06F 11/16* (2006.01)

(52) U.S. Cl.
 CPC ...... *G06F 11/1068* (2013.01); *G06F 11/0778* (2013.01); *G06F 11/1666* (2013.01)

(58) Field of Classification Search
 None
 See application file for complete search history.

(56) References Cited

U.S. PATENT DOCUMENTS

| | | | | |
|---|---|---|---|---|
| 7,145,800 B2 * | 12/2006 | Roohparvar | ......... | G11C 16/107 |
| | | | | 365/185.11 |
| 8,081,511 B2 * | 12/2011 | Han | ...................... | G11C 29/846 |
| | | | | 365/185.11 |

| | | | | |
|---|---|---|---|---|
| 2006/0140026 A1 * | 6/2006 | Ilkbahar | ................. | G11C 29/76 |
| | | | | 365/200 |
| 2014/0157087 A1 * | 6/2014 | Yurzola | ............... | G06F 11/1012 |
| | | | | 714/773 |
| 2018/0246783 A1 * | 8/2018 | Avraham | .............. | H03M 13/27 |
| 2020/0250029 A1 * | 8/2020 | Worledge | ............ | G06F 11/1068 |

OTHER PUBLICATIONS

E. Litvinova, K. Mostovaya and K. Krasnoyarujskaya, "Fault diagnosis and repair of SoC memory," 2008 International Conference on "Modern Problems of Radio Engineering, Telecommunications and Computer Science" (TCSET), Lviv, UKraine, 2008, pp. 635-639. (Year: 2008).*

* cited by examiner

*Primary Examiner* — Daniel F. McMahon
(74) *Attorney, Agent, or Firm* — Schwegman Lundberg & Woessner, P.A.

(57) ABSTRACT

A memory sub-system controller stores status information of the memory sub-system using redundant columns. The controller obtains a set of information representing operating conditions of a set of memory components. The controller receives user data from a host system corresponding to a portion of the set of memory components having a predetermined size. The controller appends the set of information to the user data to generate a data block that is larger than the predetermined size of the portion of the set of memory components. The controller stores the data block to the portion of the set of memory components using one or more redundant columns of the set of memory components.

20 Claims, 5 Drawing Sheets

300 ⌐

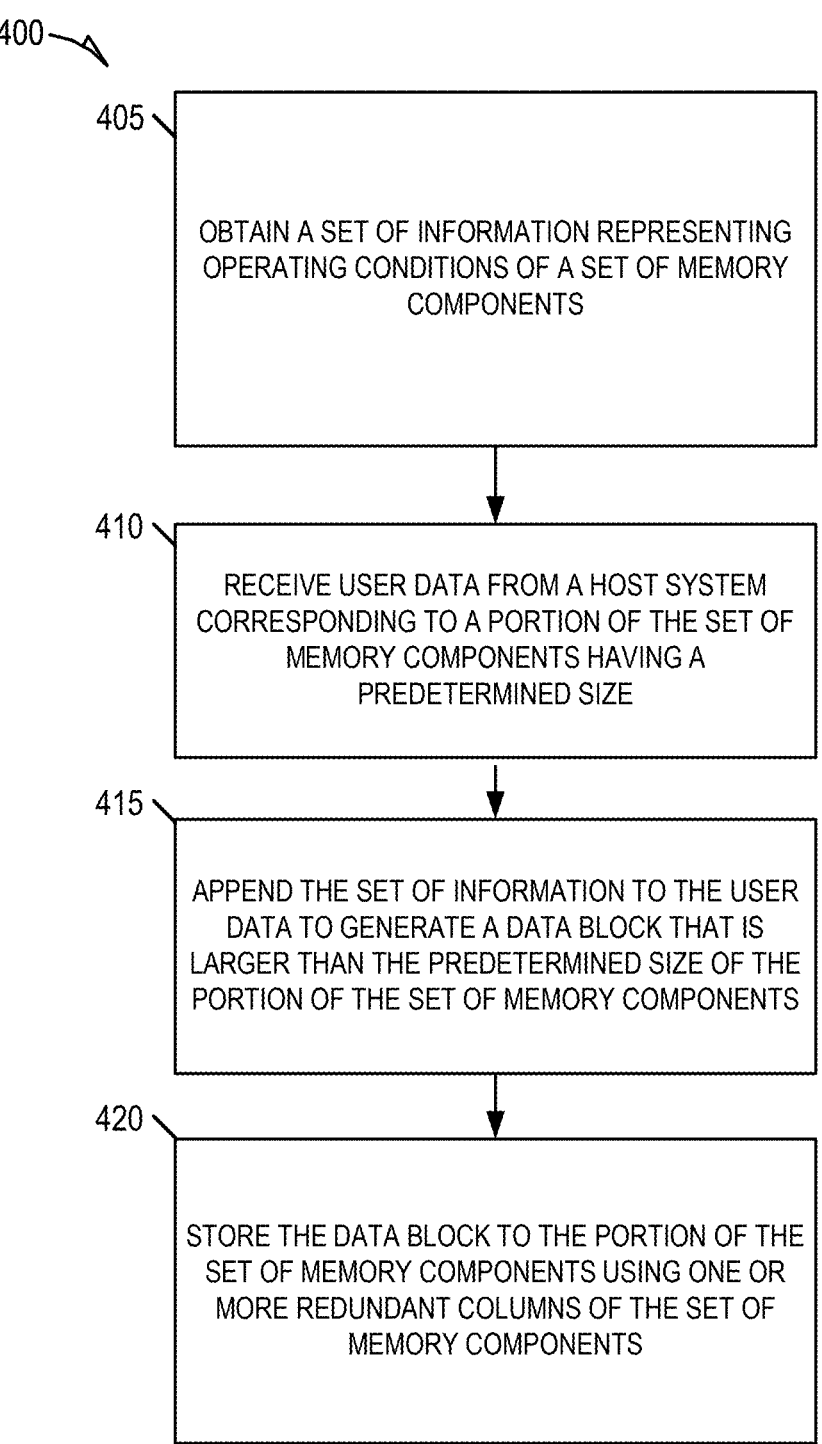

400

405 — OBTAIN A SET OF INFORMATION REPRESENTING OPERATING CONDITIONS OF A SET OF MEMORY COMPONENTS

410 — RECEIVE USER DATA FROM A HOST SYSTEM CORRESPONDING TO A PORTION OF THE SET OF MEMORY COMPONENTS HAVING A PREDETERMINED SIZE

415 — APPEND THE SET OF INFORMATION TO THE USER DATA TO GENERATE A DATA BLOCK THAT IS LARGER THAN THE PREDETERMINED SIZE OF THE PORTION OF THE SET OF MEMORY COMPONENTS

420 — STORE THE DATA BLOCK TO THE PORTION OF THE SET OF MEMORY COMPONENTS USING ONE OR MORE REDUNDANT COLUMNS OF THE SET OF MEMORY COMPONENTS

*FIG. 4*

STORING STATUS INFORMATION USING REDUNDANT COLUMNS

TECHNICAL FIELD

This disclosure relates generally to memory sub-systems and, more specifically, to providing adaptive media management for memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIG. 4 is a flow diagram of an example method to selectively store a set of information representing operating conditions of the memory sub-system, in accordance with some examples.

DETAILED DESCRIPTION

Figure 1:
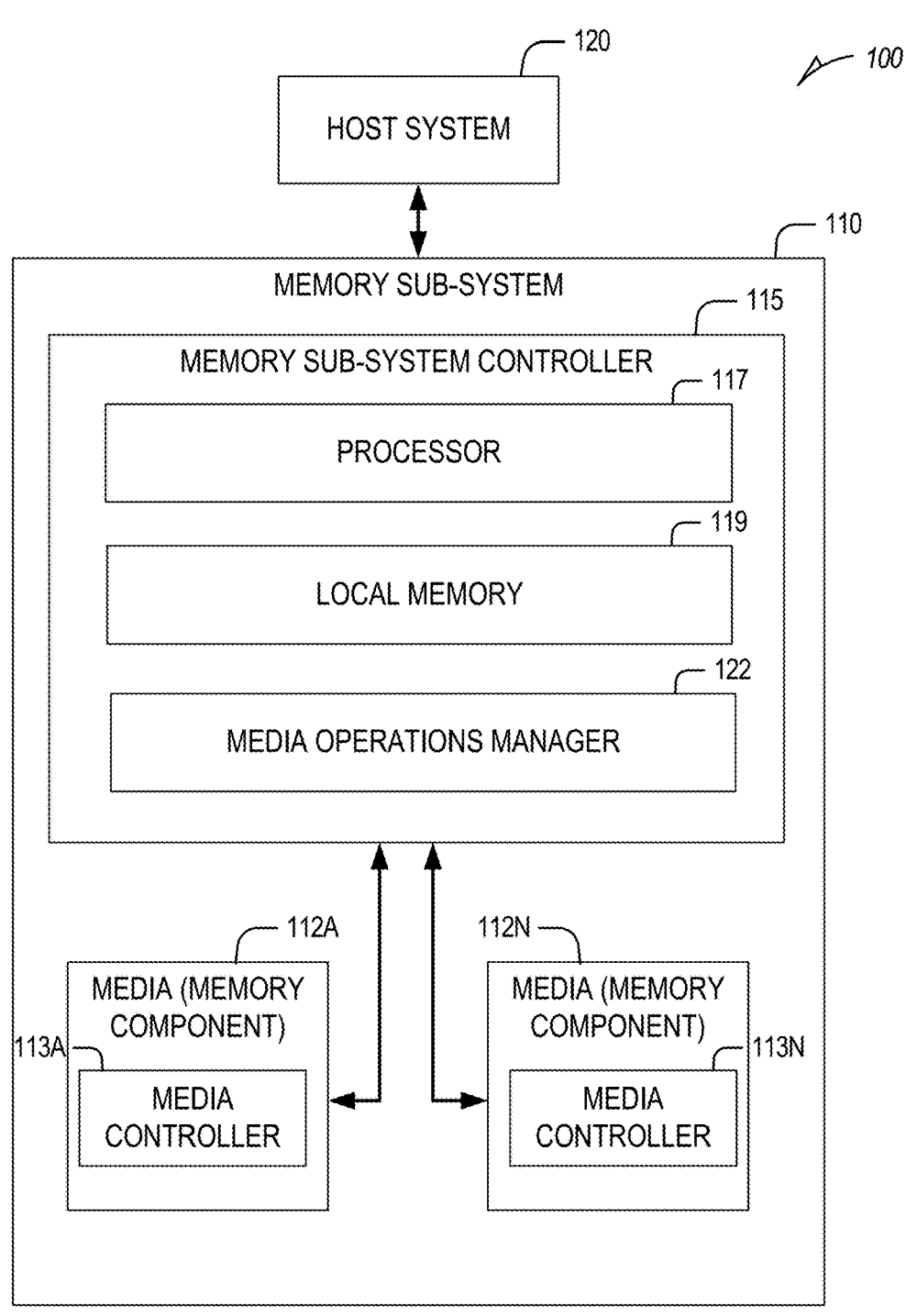
FIG. 1 is a block diagram illustrating an example computing environment including a memory sub-system, in accordance with some examples.

The present disclosure configures a system component, such as a memory sub-system controller, to selectively store status information (e.g., including operating conditions of the memory sub-system) in one or more redundant columns of a memory array. The controller can access the status information and can combine the status information with user data received from a host system. For example, the controller can append the status information to a set of sub-blocks of user data to generate a data block. The data block can correspond to a size that is larger than a predetermined size of a portion of the set of memory components. Namely, the data block can correspond to a greater number of columns of data than that which the portion is configured to store reliably. The data block can then be stored in the portion of the set of memory components using one or more redundant columns of the memory sub-system. When the status information is needed, the status information can be retrieved from the one or more redundant columns of the portion of the set of memory components together with the user data and used to selectively perform one or more memory operations and/or diagnose failure of the memory sub-system. This improves the overall efficiency of operating the memory sub-system and reduces memory resource consumption as the status information is stored in physical space (e.g., columns) of the memory sub-system that may not be entirely reliable and that has not been allocated for storing user data.

A memory sub-system can be a storage device, a memory module (or component), or a hybrid of a storage device and memory module. Examples of storage devices and memory modules are described below in conjunction with FIG. 1. In general, a host system can utilize a memory sub-system that includes one or more memory components, such as memory devices (e.g., memory dies or planes across multiple memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data."

The memory sub-system can initiate media management operations, such as a write operation, on host data that is stored on a memory device. In some examples, firmware of the memory sub-system may re-write previously written host data from a location on a memory device to a new location as part of garbage collection management operations. The data that is re-written as part of garbage collection or folding operations (for example, as initiated by the firmware) is hereinafter referred to as "garbage collection data." "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., Not AND (NAND) devices), each plane is comprised of a set of physical blocks. For some memory devices, blocks are the smallest area that can be erased. Such blocks can be referred to or addressed as logical units (LUN). Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

There are challenges in efficiently managing or performing media management operations on typical memory devices. In current NAND storage systems, manufacturers have addressed the issue of process defects by incorporating extra columns into the memory arrays. These extra columns, referred to below as redundant columns, are intended to serve as backups to replace any columns found to be defective during the manufacturing process or that fail during operation. This strategy is important for maintaining the functionality and reliability of the storage device at the reported capacity, thereby ensuring that data integrity is not compromised by physical defects in the NAND array. While these redundant columns are useful for addressing defects, they also represent a significant allocation of physical resources that often remains underutilized. As the manufacturing process improves and defect rates decrease, the likelihood of needing these extra columns diminishes. Consequently, a substantial portion of these columns remains unused, effectively becoming a dormant resource within the device. This underutilization highlights a potential inefficiency in the design and use of storage capacity within NAND devices, as these extra columns occupy physical space that could potentially be used more effectively.

Additionally, managing the storage of operating status conditions of NAND storage systems presents a significant challenge. These status conditions, which provide insights into the memory sub-system's performance, are either stored in dedicated storage areas or not stored at all. Storing this data in dedicated spaces often leads to inefficient use of valuable storage capacity that could otherwise be utilized for user data. This allocation not only wastes space but also increases the complexity of the storage system. NAND storage devices that do not store these operational statuses at all can hinder diagnostic processes. When failures occur, the absence of historical operational data makes it difficult to pinpoint the nature or timing of a malfunction. This lack of data can delay resolution times and complicate maintenance efforts, ultimately affecting the reliability and performance of the storage system. The ability to access detailed operational statuses could enhance the diagnostic capabilities, allowing for quicker and more accurate identification of issues within the memory sub-system. However, current systems lack an efficient mechanism to store such information continuously or periodically in a way that does not consume valuable physical space, processing operations, or storage resources.

The present disclosure addresses the above and other deficiencies by providing a memory controller that can selectively store status information (e.g., including operating conditions of the memory sub-system) in one or more redundant columns of a memory array. The memory controller can access the status information and can combine the status information with user data received from a host system. For example, the controller can append the status information to a set of sub-blocks of user data to generate a data block. The data block can correspond to a size that is larger than a predetermined size of a portion of the set of memory components. The data block can then be stored by the memory controller in the portion of the set of memory components using one or more redundant columns of the memory sub-system. When the status information is needed, the status information can be retrieved by the memory controller from the one or more redundant columns of the portion of the set of memory components together with the user data and used to selectively perform one or more memory operations and/or diagnose failure of the memory sub-system. This improves the overall efficiency of operating the memory sub-system and reduces memory resource consumption as the status information is stored in physical space (e.g., columns) of the memory sub-system that may not be entirely reliable and that has not been allocated for storing user data.

In some examples, the memory controller obtains a set of information representing operating conditions of the set of memory components and receives user data from a host system corresponding to a portion of the set of memory components having a predetermined size. The memory controller appends the set of information to the user data to generate a data block that is larger than the predetermined size of the portion of the set of memory components. The memory controller stores the data block to the portion of the set of memory components using one or more redundant columns of the set of memory components. The portion of the set of memory components can include a predetermined number of sub-blocks of a memory block. The portion of the set of memory components can be associated with an individual word line (WL) having a predetermined number of columns.

The one or more redundant columns can be used in place of one or more defective columns of the portion of the set of memory components to complete the predetermined size of the portion. In some cases, the memory controller duplicates the set of information a specified number of times. The memory controller appends the duplicated set of information to the user data to generate the data block. The specified number of times can include three or more and the memory controller appends three or more instances of the set of information to the user data to generate the data block. The user data can include three 16 KB chunks and the duplicated set of information can include 192 bits of data.

Each bit of the duplicated set of information can be stored in a cell associated with a respective column of the one or more redundant columns. In some examples, the data block can be stored using the one or more redundant columns without checking reliability of the one or more redundant columns. In some cases, the memory controller performs one or more verification operations on the user data that has been stored in the portion of the set of memory components without performing the one or more verification operations on the set of information stored in the one or more redundant columns. In some cases, the memory controller reads the user data from the portion of the set of memory components after storing the data block without reading the set of information from the one or more redundant columns and computes a read bit error rate (RBER) for the user data that has been read to perform the one or more verification operations.

In some examples, the set of information includes at least one of a current temperature of the memory sub-system, a data timestamp, and/or an alert including a low voltage during data programming indication. In some cases, the memory controller receives a request to read the portion of the set of memory components and selectively retrieves the set of information from the portion of the set of memory components in response to receiving the request. The memory controller retrieves the data block from the portion of the set of memory components including the set of information. The memory controller determines whether a majority of multiple copies of the set of information retrieved from the portion of the set of memory components includes identical data and, in response to determining that the majority of the multiple copies of the set of information includes the identical data, performs one or more memory operations based on the identical data.

The memory controller can determine that a temperature gap between a program temperature indicated by the identical data and a current temperature of the set of memory components transgresses a temperature threshold. The memory controller performs cross temperature handling to read the user data from the data block to reduce probability of read failure in response to determining that the temperature gap transgresses the temperature threshold. In some cases, the memory controller determines that a time period between a program time indicated by the identical data and a current time transgresses a time threshold. The memory controller selectively adjusts a read threshold voltage to read the user data from the data block in response to determining that the time period transgresses the time threshold.

In some examples, the memory sub-system includes a three-dimensional (3D) storage device (e.g., a 3D NAND memory sub-system). Each of the one or more redundant columns can be configured to store three bits per memory cell, such as in a tri-level cell storage of the memory sub-system. In some cases, the one or more redundant columns are associated with a reliability value that is lower than the reliability value of other columns allocated for storing user data. In such cases, the one or more redundant columns may or may not be allocated for storing user data.

Though various examples are described herein as being implemented with respect to a memory sub-system (e.g., a controller of the memory sub-system), some or all of the portions of an example can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies). Each memory die can include a plurality of planes in which data can be stored or programmed.

In some examples, the first memory component 112A including (a word line (WL), a word line group (WLG), a block, portion, column of memory cells, or page of the first memory component 112A), or group of memory components including the first memory component 112A can be associated with a first reliability (capability) grade, value, measure, or lifetime program-erase count (PEC). The terms "reliability grade," "value," and "measure" are used interchangeably throughout and can have the same meaning. The second memory component 112N (a WL, a WLG, a block, portion, column of memory cells, or page of the second memory component 112N) or group of memory components including the second memory component 112N can be associated with a second reliability (capability) grade, value, measure, or lifetime PEC. In some examples, each memory component 112A to 112N can store respective configuration data that specifies the respective reliability grade and lifetime PEC and current PEC. In some examples, a memory or register can be associated with all of the memory components 112A to 112N and can store a table that maps different groups, bins, or sets of the memory components 112A to 112N to respective reliability grades, lifetime PEC values, read threshold voltages, program (write) temperatures, and/or current PEC values.

In some examples, the memory sub-system 110 is a storage system. A memory sub-system 110 can be a storage device, a memory module, or a hybrid of a storage device and memory module. Examples of a storage device include a SSD, a flash drive, a universal serial bus (USB) flash drive, an embedded Multi-Media Controller (eMMC) drive, and a Universal Flash Storage (UFS) drive. Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL), a USB interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe or CXL interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a NAND-type flash memory and/or a 3D NAND flash memory. Each of the memory components 112A to 112N can include one or more arrays of memory cells such as single-level cells (SLCs) or multi-level cells (MLCs) (e.g., tri-level cell (TLCs) or quad-level cell (QLCs)). Each array can include multiple columns of memory cells. In some examples, a particular memory component 112A can include both a SLC portion and a MLC portion of memory cells. Each of the memory cells can store one or more bits of data (e.g., blocks) used by the host system 120. Although nonvolatile memory components such as NAND-type flash memory are described, the memory components 112A to 112N can be based on any other type of memory, such as a volatile memory. In some examples, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells.

In NAND flash memory, such as in each of the set of memory components 112A to 112N, data can be organized into an array of cells that store bits of information, arranged into columns and rows, with rows referred to as WLs. Each column can be composed of multiple cells stacked vertically, forming a string. Data in NAND flash can be written at the page level, where each page spans multiple columns and is part of a larger block. Each page can include multiple sub-blocks of the larger memory block. During the writing process, data is loaded into the page buffer and then programmed into the cells across the selected columns of that page. For reading data, the memory controller addresses the specific page and column where the data is stored. The charge stored in the cells of that column is read out, with the amount of charge determining the stored data value, such as a '1' or a '0' in SLC. Erasing is performed at the block level, necessitating the clearing of all pages within a block simultaneously due to the physical characteristics of NAND flash, which only allows whole blocks to be erased at a time.

Columns and WLs are useful to the organization and access of data in NAND flash. Columns allow for the independent access of each column, supporting parallel processing and enhancing performance. WLs connect cells horizontally and are used for accessing and controlling the cells across different columns. This structure supports operational efficiency and also aids in implementing error handling and redundancy strategies. For example, additional redundant columns (or extra columns) can be incorporated into the array to replace any that become defective, thereby maintaining data integrity and system reliability.

A cross-point array of non-volatile memory cells can perform bit storage based on a change of bulk resistance in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. For example, a single first row that spans a first set of the pages or blocks of the memory components 112A to 112N can correspond to or be grouped as a first block stripe, and a single second row that spans a second set of the pages or blocks of the memory components 112A to 112N can correspond to or be grouped as a second block stripe.

A memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, different read disturb management, garbage collection operations, different near miss ECC operations, and/or different dynamic data refresh.

The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include ROM for storing microcode. While the example memory sub-system 110 in FIG. 1 has been illustrated as including the memory sub-system controller 115, in another example of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112A to 112N. The configuration data can describe the lifetime PEC values and/or reliability grades associated with different groups of the memory components 112A to 112N and/or different WLs, WLGs, columns, and/or blocks within each of the memory components 112A to 112N.

The memory sub-system controller 115 can be responsible for other memory management operations, such as wear leveling operations, garbage collection operations, error detection and ECC operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some examples, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which are raw memory devices combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to selectively store status information (e.g., including operating conditions of the memory sub-system) in one or more redundant columns of a memory array. The media operations manager 122 can access the status information and can combine the status information with user data received from a host system 120. For example, the media operations manager 122 can append the status information to a set of sub-blocks of user data to generate a data block. The data block can correspond to a size that is larger than a predetermined size of a portion of the set of memory components 112A to 112N. Namely, the data block can correspond to a greater number of columns of data than that which the portion is configured to store reliably. The data block can then be stored in the portion of the set of memory components 112A to 112N using one or more redundant columns of the memory sub-system 110. When the status information is needed, the status information can be retrieved from the one or more redundant columns of the portion of the set of memory components 112A to 112N together with the user data and used to selectively perform one or more memory operations and/or diagnose failure of the memory sub-system 110. This improves the overall efficiency of operating the memory sub-system 110 and reduces memory resource consumption as the status information is stored in physical space (e.g., columns) of the memory sub-system 110 that may not be entirely reliable and that has not been allocated for storing user data.

In some examples, the media operations manager 122 can comprise logic (e.g., a set of transitory or non-transitory machine instructions, such as firmware) or one or more components that cause the media operations manager 122 to perform operations described herein. The media operations manager 122 can comprise a tangible or non-tangible unit capable of performing operations described herein. Further details with regards to the operations of the media operations manager 122 are described below.

Figure 2:
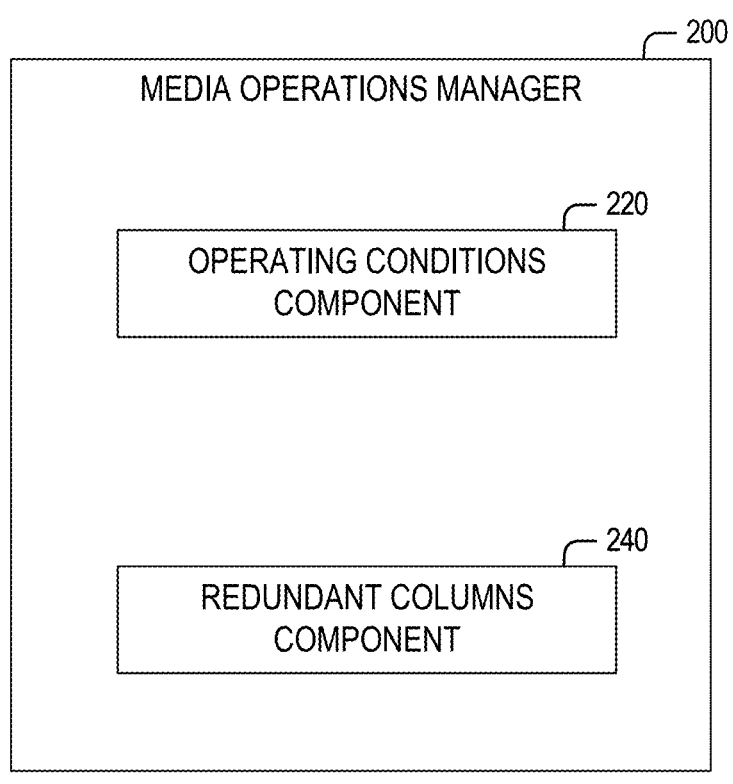
FIG. 2 is a block diagram of an example media operations manager, in accordance with some examples.

FIG. 2 is a block diagram of an example media operations manager 200 (corresponding to media operations manager 122), in accordance with some examples. As illustrated, the media operations manager 200 includes operating conditions component 220 and a redundant columns component 240. In some cases, the media operations manager 200 can differ in components or arrangement (e.g., less or more components) from what is illustrated in FIG. 2.

The operating conditions component 220 can generate and/or access information about current operating conditions of the memory sub-system 110. For example, the operating conditions component 220 can generate and/or access the information or set of information periodically, continuously, and/or in response to specific commands from the memory sub-system controller 115. The set of information that is generated can include a current timestamp, a current temperature, and/or one or more alerts, such as an alert that indicates a low voltage during data programming indication. Any other suitable internal error condition and/or internal status, such as buffer capacity, power information, power failure event information, and/or combination thereof can be included as part of the set of information generated and/or accessed by the operating conditions component 220.

The operating conditions component 220 can provide the set of information to the redundant columns component 240. The redundant columns component 240 can selectively store the set of information in one or more redundant columns of the memory array of the set of memory components 112A to 112N. For example, the redundant columns component 240 can wait for a set of user data to be received from the host system 120. The redundant columns component 240 can then access a chunk or several chunks of user data that spans an individual WL of a portion of the set of memory components 112A to 112N. The redundant columns component 240 can append the set of information to the chunk/chunks that span the WL. This results in a data block that is of a size that is greater than a specified or predetermined size of the WL.

For example, a WL can be configured and available to store a predetermined amount of information, such as 42 KB of user data (e.g., three 16 KB chunks of user data) across a specified number of columns. The columns used to store the user data or that are configured to store the user data can do so with a reliability value that transgresses a minimum reliability threshold. The redundant columns component 240 can generate a data block that surpasses or exceeds the specified number of columns and is beyond the maximum reported size of the WL. For example, the redundant columns component 240 can append the set of information to the 42 KB of user data to generate a data block that is 64 bits or up to 192 bits in size greater than the predetermined amount of information that the WL is configured to store. This may require 64 or up to 192 extra columns of memory cells to be used to store the user data together with the set of information. The extra columns used to store the set of information can be of a lower reliability value than the predetermined columns used to store the user data. Namely, the redundant columns component 240 can be configured to store the set of information in the data block in the redundant columns. The redundant columns may have a reliability value that is below the minimum reliability threshold.

Figure 3:
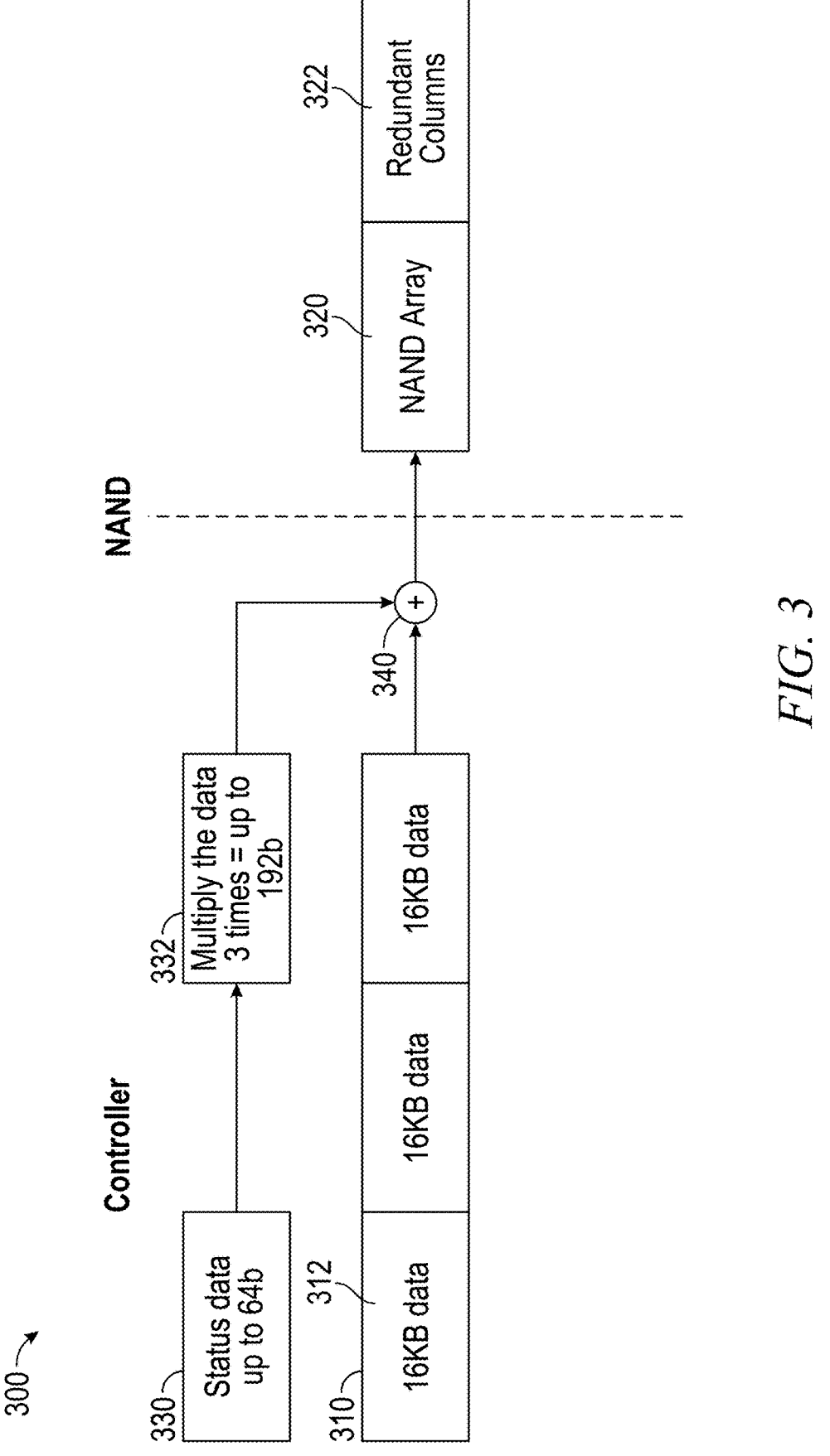
FIG. 3 is a block diagram of generating a data block that includes user data and a set of information representing operating conditions of the memory sub-system, in accordance with some examples.

Specifically, as shown in the diagram 300 of FIG. 3, the redundant columns component 240 can receive status data 330 (e.g., up to 64 bits of status data) from the operating conditions component 220. The status data 330 can include one or more current operating conditions of the memory sub-system 110 and/or the set of memory components 112A to 112N, such as a current timestamp and/or temperature. The redundant columns component 240 can duplicate the status data 330 any number of times, such as three times to generate a set of information block 332 that includes three times the status data 330 (e.g., the set of information block 332 can include up to 192 bits of data). The redundant columns component 240 duplicates the data because the extra columns in which the data is stored have a reliability value that is below the minimum reliability threshold and so the data may be lost or unreadable. Storing multiple copies of the same data can reduce the likelihood of data loss without consuming extra resources as the extra columns would otherwise go unused. This is because the extra columns are not configured to store user data.

The redundant columns component 240 can receive user data 310 from the host system 120. The user data 310 can include multiple data chunks 312 that in total correspond to a size of the WL of a portion of the set of memory components 112A to 112N. Namely, the size of the user data 310 can correspond to the number of columns of the WL that are configured to reliably store user data (e.g., the number of columns that have a reliability value that transgresses the minimum reliability threshold). The redundant columns component 240 can append or combine the set of information block 332 with the tail end of the user data 310 using an append operation 340. This can form or generate a data block that is 42 KB plus 192 bits in size.

The redundant columns component 240 can send the generated data block that includes the status data 330 (e.g., the multiple copies of the status data 330) to the set of memory components 112A to 112N to be programed/stored. Specifically, the redundant columns component 240 can instruct the set of memory components 112A to 112N to store the generate data block across a single WL of the NAND array 320 including one or more redundant columns 322. This can be performed without first checking whether the one or more redundant columns 322 have a reliability value that transgresses the minimum reliability threshold. Namely, the configuration data can store information about which columns of the memory array have a reliability that transgresses the minimum reliability threshold (e.g., are good columns) and which do not (e.g., are bad columns). Accessing this information can consume processing resources and time and may reduce the operating efficiency of the memory sub-system 110. Because the set of information block 332 includes non-essential information (e.g., excludes user data), it may not be necessary to store this data reliably. As such, the redundant columns component 240 can store the set of information block 332 in the redundant columns without verifying in the configuration data whether the columns are good or bad. In order to reduce the likelihood of losing data because this data may be stored in bad columns, the redundant columns component 240 duplicates the data multiple times up to the number of available redundant columns.

The set of information block 332 can be stored in the one or more redundant columns 322 (e.g., 192 columns) while the user data 310 is stored in predetermined columns of the WL that have a reliability value that transgresses the minimum reliability threshold. In some cases, the redundant columns component 240 can verify that the user data 310 that has been programmed to the WL is associated with an RBER that is below a threshold without reading or verifying portions of data stored in the one or more redundant columns 322.

Specifically, after storing the data block to the portion of the set of memory components 112A to 112N, the redundant columns component 240 can read back only the portion of the set of memory components 112A to 112N that is stored in the columns that have the reliability value that transgresses the minimum reliability threshold while excluding reading back the portions stored in the one or more redundant columns 322 (e.g., the portion that includes the set of information block 332). In some cases, the entire data block is read and verified to determine whether the RBER is below the threshold.

The redundant columns component 240 can receive a request from the host system 120 to read back data stored in the portion of the set of memory components 112A to 112N. In response to such a request, the redundant columns component 240 can retrieve data from only the good columns without reading back any of the data stored in the one or more redundant columns 322. The redundant columns component 240 can, in this way, selectively retrieve the set of information block 332 from the one or more redundant columns 322 as needed.

For example, the redundant columns component 240 can receive a request to read the set of information block 332 that is associated with the user data 310 stored in the portion of the set of components 112A to 112N. In such cases, the redundant columns component 240 can retrieve or read the portion of the set of memory components 112A to 112N including the one or more redundant columns 322. The redundant columns component 240 can access each portion of the data stored in the retrieved block from the one or more redundant columns 322. The redundant columns component 240 can determine how many of the portions retrieved from the one or more redundant columns 322 include identical data. Namely, the redundant columns component 240 can access a first portion of the data from the one or more redundant columns 322 corresponding to a first 64 bit chunk, a second portion of the data from the one or more redundant columns 322 corresponding to a second 64 bit chunk, and a third portion of the data from the one or more redundant columns 322 corresponding to a third 64 bit chunk.

The redundant columns component 240 can determine that the first and third portions (e.g., the first and third 64 bit chunks) include identical data and that the second portion includes different data from the first and third 64 bit chunks. This may be the case when the one or more redundant columns 322 used to store the second portion were bad columns or failed. The redundant columns component 240 can determine whether a majority of the chunks read from the one or more redundant columns 322 include identical data. Namely, the redundant columns component 240 can determine that because two of the chunks (e.g., the first and third 64 bit chunks) out of three chunks had identical data, the identical data included in the first and third 64 bit chunks is reliable and represents correct information. In such cases, the redundant columns component 240 can use a single instance of the identical data to control performing one or more operations and/or to perform diagnostic operations. If a majority of the chunks read from the one or more redundant columns 322 fail to have identical data, the redundant columns component 240 can prevent using the status information represented by any of the chunks read from the one or more redundant columns 322.

For example, the redundant columns component 240 can determine a program temperature associated with programming the user data 310 portion of the data block read from the portion of the set of memory components 112A to 112N from which the reliable identical data was stored in the redundant columns component 240. The redundant columns component 240 can compare the program temperature to a current temperature to compute a temperature gap. The redundant columns component 240 can determine that the temperature gap transgresses a temperature threshold and, in response, conditionally and/or selectively perform cross temperature handling to read the user data 310 from the data block. Cross temperature handling can consume processing operations and conditioning their performance can improve efficiencies and expedite read operations. The cross temperature handling operations can be performed to reduce probability of read failure in cases where the temperature gap between the program temperature and read temperature transgresses the temperature threshold.

As another example, the redundant columns component 240 can determine a program timestamp associated with programming the user data 310 portion of the data block read from the portion of the set of memory components 112A to 112N from which the reliable identical data was stored in the redundant columns component 240. The redundant columns component 240 can compare the program timestamp to a current time to compute a time period between when the data was programmed and when the data is being read. The redundant columns component 240 can determine that the time period transgresses a time threshold and, in response, conditionally and/or selectively adjust the read threshold voltage used to read the user data 310 from the data block.

FIG. 4 is a flow diagram of an example method to selectively store a set of information representing operating conditions of the memory sub-system, in accordance with some examples. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 400 is performed by the media operations manager 122 of FIG. 1. Although the processes are shown in a particular sequence or order, unless otherwise specified, the order of the processes can be modified. Thus, the illustrated techniques should be understood only as examples, and the illustrated processes can be performed in a different order, and some processes can be performed in parallel. Additionally, one or more processes can be omitted in various examples. Thus, not all processes are required in every example. Other process flows are possible.

Referring now to FIG. 4, the method (or process) 400 begins at operation 405, with a media operations manager 122 of a memory sub-system (e.g., memory sub-system 110) obtaining a set of information representing operating conditions of the set of memory components. Then, at operation 410, the media operations manager 122 of the memory sub-system 110 receives user data from a host system corresponding to a portion of the set of memory components having a predetermined size. Thereafter, at operation 415, the media operations manager 122 appends the set of information to the user data to generate a data block that is larger than the predetermined size of the portion of the set of memory components. Then, at operation 420, the media operations manager 122 stores the data block to the portion of the set of memory components using one or more redundant columns of the set of memory components. The method 400 to store the set of information in one or more redundant columns can be performed periodically or each time a request to program data is received from the host system 120.

In view of the disclosure above, various examples are set forth below. It should be noted that one or more features of an example, taken in isolation or combination, should be considered within the disclosure of this application.

Example 1: A system comprising: a set of memory components of a memory sub-system; and at least one processing device operatively coupled to the set of memory components, the at least one processing device being configured to perform operations comprising: obtaining a set of information representing operating conditions of the set of memory components; receiving user data from a host system corresponding to a portion of the set of memory components having a predetermined size; appending the set of information to the user data to generate a data block that is larger than the predetermined size of the portion of the set of memory components; and storing the data block to the portion of the set of memory components using one or more redundant columns of the set of memory components.

Example 2. The system of Example 1, wherein the portion of the set of memory components comprises a predetermined number of sub-blocks of a memory block.

Example 3. The system of Example 2, wherein the portion of the set of memory components is associated with an individual WL having a predetermined number of columns.

Example 4. The system of any one of Examples 1-3, wherein the one or more redundant columns are used in place of one or more defective columns of the portion of the set of memory components to complete the predetermined size of the portion.

Example 5. The system of any one of Examples 1-4, the operations comprising: duplicating the set of information a specified number of times.

Example 6. The system of Example 5, the operations comprising: appending the duplicated set of information to the user data to generate the data block.

Example 7. The system of Example 6, wherein the specified number of times comprises three, the operations comprising appending three instances of the set of information to the user data to generate the data block.

Example 8. The system of Example 7, wherein the user data comprises three 16 KB chunks, and wherein the duplicated set of information comprises 192 bits of data.

Example 9. The system of Example 8, wherein each bit of the duplicated set of information is stored in a cell associated with a respective column of the one or more redundant columns.

Example 10. The system of any one of Examples 1-9, wherein the data block is stored using the one or more redundant columns without checking reliability of the one or more redundant columns.

Example 11. The system of any one of Examples 1-10, the operations comprising: performing one or more verification operations on the user data that has been stored in the portion of the set of memory components without performing the one or more verification operations on the set of information stored in the one or more redundant columns.

Example 12. The system of Example 11, the operations comprising: reading the user data from the portion of the set of memory components after storing the data block without reading the set of information from the one or more redundant columns; and computing a RBER for the user data that has been read to perform the one or more verification operations.

Example 13. The system of any one of Examples 1-12, wherein the set of information comprises at least one of a current temperature of the memory sub-system, a data timestamp, or an alert comprising a low voltage during data programming indication.

Example 14. The system of any one of Examples 1-13, the operations comprising: receiving a request to read the portion of the set of memory components; and selectively retrieving the set of information from the portion of the set of memory components in response to receiving the request.

Example 15. The system of Example 14, the operations comprising: retrieving the data block from the portion of the set of memory components comprising the set of information; determining whether a majority of multiple copies of the set of information retrieved from the portion of the set of memory components comprises identical data; and in response to determining that the majority of the multiple copies of the set of information comprises the identical data, performing one or more memory operations based on the identical data.

Example 16. The system of Example 15, the operations comprising: determining that a temperature gap between a program temperature indicated by the identical data and a current temperature of the set of memory components transgresses a temperature threshold; and performing cross temperature handling to read the user data from the data block to reduce probability of read failure in response to determining that the temperature gap transgresses the temperature threshold.

Example 17. The system of any one of Examples 15-16, the operations comprising: determining that a time period between a program time indicated by the identical data and a current time transgresses a time threshold; and selectively adjusting a read threshold voltage to read the user data from the data block in response to determining that the time period transgresses the time threshold.

Example 18. The system of any one of Examples 1-17, wherein the memory sub-system comprises a 3D storage device, wherein each of the one or more redundant columns is configured to store three bits per memory cell, and wherein the identical data comprises log or diagnostic information representing usage of the memory sub-system (e.g., the information can represent how a customer uses the storage device for diagnostic purposes, such as to improve the system behavior, help with failure analysis, and so forth).

Methods and computer-readable storage medium with instructions for performing any one of the above Examples.

Figure 5:
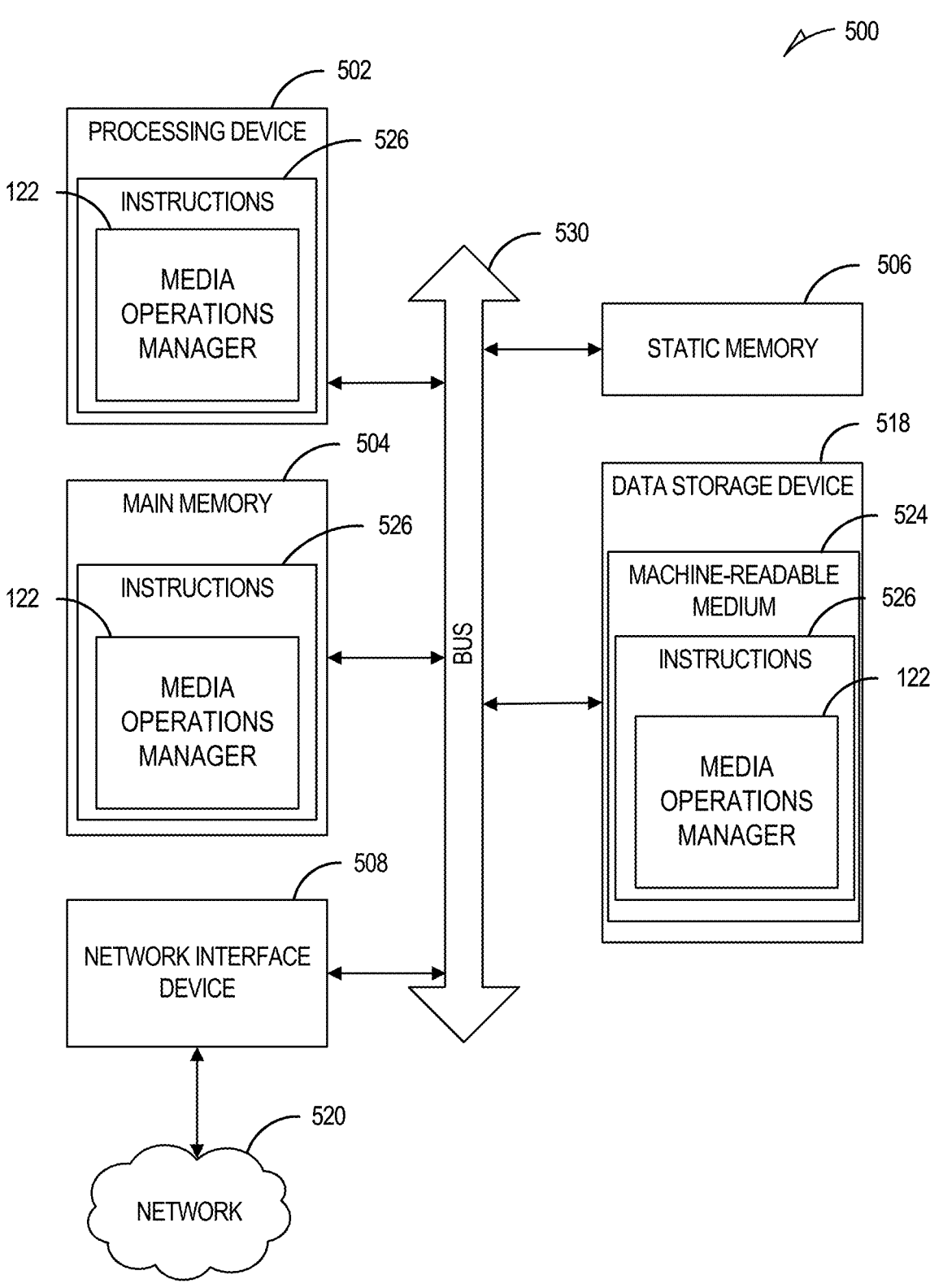
FIG. 5 is a block diagram illustrating a diagrammatic representation of a machine in the form of a computer system within which a set of instructions can be executed for causing the machine to perform any one or more of the methodologies discussed herein, in accordance with some examples.

FIG. 5 illustrates an example machine in the form of a computer system 500 within which a set of instructions can be executed for causing the machine to perform any one or more of the methodologies discussed herein. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., ROM, flash memory, DRAM such as SDRAM or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device 502 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 502 can also be one or more special-purpose processing devices such as an ASIC, a FPGA, a digital signal processor (DSP), a network processor, or the like. The processing device 502 is configured to execute instructions 526 for performing the operations and steps discussed herein. The computer system 500 can further include a network interface device 508 to communicate over a network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one example, the instructions 526 implement functionality corresponding to the media operations manager 122 of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; ROMs; RAMs; EPROMs; EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a ROM, RAM, magnetic disk storage media, optical storage media, flash memory components, and so forth.

In the foregoing specification, examples of the disclosure have been described. It will be evident that various modifications can be made thereto without departing from the broader scope of the disclosure as set forth in the following claims. The specification and drawings are, accordingly, to be regarded in an illustrative sense rather than a restrictive sense.

What is claimed is:

1. A system comprising:
a set of memory components of a memory sub-system; and
at least one processing device operatively coupled to the set of memory components, the at least one processing device being configured to perform operations comprising:
obtaining a set of information representing operating conditions of the set of memory components;
receiving user data from a host system corresponding to a portion of the set of memory components having a predetermined size;
appending the set of information to the user data to generate a data block that is larger than the predetermined size of the portion of the set of memory components; and storing the data block to the portion of the set of memory components using one or more redundant columns of the set of memory components.

2. The system of claim 1, wherein the portion of the set of memory components comprises a predetermined number of sub-blocks of a memory block.

3. The system of claim 2, wherein the portion of the set of memory components is associated with an individual word line (WL) having a predetermined number of columns.

4. The system of claim 1, wherein the one or more redundant columns are used in place of one or more defective columns of the portion of the set of memory components to complete the predetermined size of the portion.

5. The system of claim 1, the operations comprising:
duplicating the set of information a specified number of times.

6. The system of claim 5, the operations comprising:
appending the duplicated set of information to the user data to generate the data block.

7. The system of claim 6, wherein the specified number of times comprises three, the operations comprising appending three instances of the set of information to the user data to generate the data block.

8. The system of claim 7, wherein the user data comprises three 16 KB chunks; and
wherein the duplicated set of information comprises 192 bits of data.

9. The system of claim 8, wherein each bit of the duplicated set of information is stored in a cell associated with a respective column of the one or more redundant columns.

10. The system of claim 1, wherein the data block is stored using the one or more redundant columns without checking reliability of the one or more redundant columns.

11. The system of claim 1, the operations comprising:
performing one or more verification operations on the user data that has been stored in the portion of the set of memory components without performing the one or more verification operations on the set of information stored in the one or more redundant columns.

12. The system of claim 11, the operations comprising:
reading the user data from the portion of the set of memory components after storing the data block without reading the set of information from the one or more redundant columns; and
computing a read bit error rate (RBER) for the user data that has been read to perform the one or more verification operations.

13. The system of claim 1, wherein the set of information comprises at least one of a current temperature of the memory sub-system, a data timestamp, or an alert comprising a low voltage during data programming indication.

14. The system of claim 1, the operations comprising:
receiving a request to read the portion of the set of memory components; and
selectively retrieving the set of information from the portion of the set of memory components in response to receiving the request.

15. The system of claim 14, the operations comprising:
retrieving the data block from the portion of the set of memory components comprising the set of information;
determining whether a majority of multiple copies of the set of information retrieved from the portion of the set of memory components comprises identical data; and
in response to determining that the majority of the multiple copies of the set of information comprises the identical data, performing one or more memory operations based on the identical data.

16. The system of claim 15, the operations comprising:

determining that a temperature gap between a program temperature indicated by the identical data and a current temperature of the set of memory components transgresses a temperature threshold; and performing cross temperature handling to read the user data from the data block to reduce probability of read failure in response to determining that the temperature gap transgresses the temperature threshold.

17. The system of claim 15, the operations comprising:

determining that a time period between a program time indicated by the identical data and a current time transgresses a time threshold; and selectively adjusting a read threshold voltage to read the user data from the data block in response to determining that the time period transgresses the time threshold.

18. The system of claim 15, wherein the memory sub-system comprises a three-dimensional (3D) storage device, wherein each of the one or more redundant columns is configured to store three bits per memory cell, and wherein the identical data comprises log or diagnostic information representing usage of the memory sub-system.

19. A method comprising:

obtaining a set of information representing operating conditions of a set of memory components;

receiving user data from a host system corresponding to a portion of the set of memory components having a predetermined size;

appending the set of information to the user data to generate a data block that is larger than the predetermined size of the portion of the set of memory components; and storing the data block to the portion of the set of memory components using one or more redundant columns of the set of memory components.

20. A non-transitory computer-readable storage medium comprising instructions that, when executed by at least one processing device, cause the at least one processing device to perform operations comprising:

obtaining a set of information representing operating conditions of a set of memory components;

receiving user data from a host system corresponding to a portion of the set of memory components having a predetermined size;

appending the set of information to the user data to generate a data block that is larger than the predetermined size of the portion of the set of memory components; and storing the data block to the portion of the set of memory components using one or more redundant columns of the set of memory components.

* * * * *